US00RE47859E

(19) United States
(12) Reissued Patent
Ladewig et al.

(10) Patent Number: US RE47,859 E
(45) Date of Reissued Patent: Feb. 18, 2020

(54) AREA LIGHT FIXTURE

(71) Applicant: Cooper Technologies Company, Houston, TX (US)

(72) Inventors: Christopher Ladewig, Fayetteville, GA (US); Timothy Wright, Peachtree City, GA (US)

(73) Assignee: Eaton Intelligent Power Limited, Dublin (IE)

(21) Appl. No.: 29/663,144

(22) Filed: Sep. 12, 2018

Related U.S. Patent Documents

Reissue of:
(64) Patent No.: Des. 766,485
Issued: Sep. 13, 2016
Appl. No.: 29/525,451
Filed: Apr. 29, 2015

(51) LOC (12) Cl. ..... 26-05
(52) U.S. Cl.
USPC ..... D26/71
(58) Field of Classification Search
USPC ..... D26/67–71, 92
CPC .... F21V 17/104; F21V 19/0045; F21V 21/02; F21V 15/01; F21S 9/03; F21S 8/085; F21S 8/086; F21W 2131/103
See application file for complete search history.

(56) References Cited

U.S. PATENT DOCUMENTS

| | | | | | |
|---|---|---|---|---|---|
| D220,778 | S | * | 5/1971 | Jablonski et al. | D26/71 |
| D391,659 | S | | 3/1998 | Gaskins | |
| D609,384 | S | * | 2/2010 | Gray | D26/71 |
| D615,234 | S | * | 5/2010 | Oblak | D26/71 |
| D652,557 | S | | 1/2012 | Boissevain | |
| D672,491 | S | * | 12/2012 | Shin | D26/71 |
| D676,173 | S | * | 2/2013 | Akinrele | D26/71 |
| D676,174 | S | * | 2/2013 | Akinrele | D26/71 |

(Continued)

OTHER PUBLICATIONS

"Pure in the form and function, defining performance: Specification Grade Luminaires". LED Solution. Philips. p. 1-21. Feb. 2015. www.philips.com/luminaires.

(Continued)

*Primary Examiner* — Philip S Hyder
(74) *Attorney, Agent, or Firm* — King & Spalding LLP

(57) CLAIM

The ornamental design for an area light fixture, as shown and described.

DESCRIPTION

FIG. 1 is a bottom perspective view of an area light fixture, showing our new design;
FIG. 2 is a top perspective view thereof;
FIG. 3 is a top plan view thereof;
FIG. 4 is a bottom plan view thereof;
FIG. 5 is a front elevation view thereof;
FIG. 6 is a rear elevation view thereof;
FIG. 7 is a right side elevation view thereof; and
FIG. 8 is a left side elevation view thereof.
FIG. 9 is a bottom perspective view of another embodiment of an area light fixture, showing our new design;
FIG. 10 is a top perspective view thereof;
FIG. 11 is a top plan view thereof;
FIG. 12 is a bottom plan view thereof;
FIG. 13 is a front elevation view thereof;
FIG. 14 is a rear elevation view thereof;
FIG. 15 is a right side elevation view thereof; and,
FIG. 16 is a left side elevation view thereof.
The broken lines shown represent unclaimed subject matter and form no part of the claimed design.

1 Claim, 12 Drawing Sheets

Figure 6:
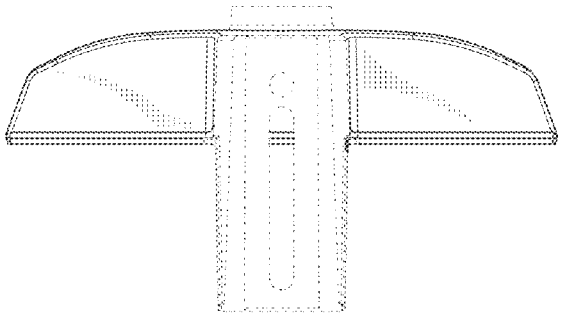
Figure 14:
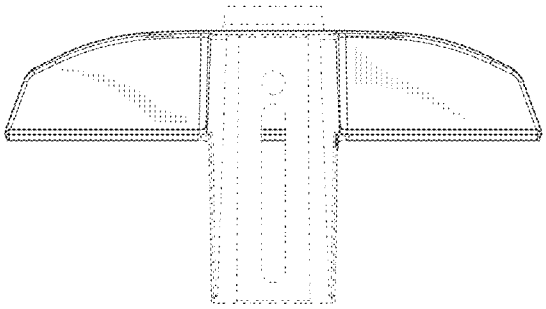

Matter enclosed in heavy brackets [ ] appears in the original patent but forms no part of this reissue; matter printed in italics indicates the additions made by reissue.

AMENDED

AMENDED

(56) References Cited

U.S. PATENT DOCUMENTS

| | | | | | |
|---|---|---|---|---|---|
| D676,175 | S | * | 2/2013 | Akinrele | D26/71 |
| D676,176 | S | * | 2/2013 | Akinrele | D26/71 |
| D676,177 | S | * | 2/2013 | Akinrele | D26/71 |
| D676,178 | S | * | 2/2013 | Akinrele | D26/71 |
| D688,404 | S | * | 8/2013 | Boissevain | D26/71 |
| D689,233 | S | | 9/2013 | Boissevain | |
| D695,437 | S | * | 12/2013 | Johnson | D26/71 |
| D710,046 | S | | 7/2014 | Mocek | |
| D717,989 | S | | 11/2014 | Heim | |
| D726,947 | S | | 4/2015 | Boyer | |
| D729,968 | S | * | 5/2015 | Szalontai | D26/71 |
| D747,527 | S | * | 1/2016 | Guercio | D26/71 |
| D760,935 | S | * | 7/2016 | Jurdana | D26/71 |
| D760,936 | S | * | 7/2016 | Jurdana | D26/71 |
| D760,937 | S | * | 7/2016 | Jurdana | D26/71 |
| D766,485 | S | | 9/2016 | Ladewig et al. | |
| D793,601 | S | | 8/2017 | Ladewig et al. | |
| 2010/0085751 | A1 | | 4/2010 | Shaner | |
| 2013/0188371 | A1 | * | 7/2013 | Ham | F21S 8/086 362/373 |
| 2014/0168932 | A1 | | 6/2014 | Boomgaarden | |
| 2015/0345772 | A1 | | 12/2015 | Duckworth | |

OTHER PUBLICATIONS

"OSQ Series: LED Area Light. Installation Instruction". CREE. p. 1-3. May 28, 2014. www.cree.com/lighting.

Lithonia Lighting; Universal Mounting Bracket; Brochure, Oct. 2013.

Kim Lighting; Altitude Installation Instructions, Hubbell Lighting, Jul. 18, 2014.

* cited by examiner

FIG. 1
AMENDED
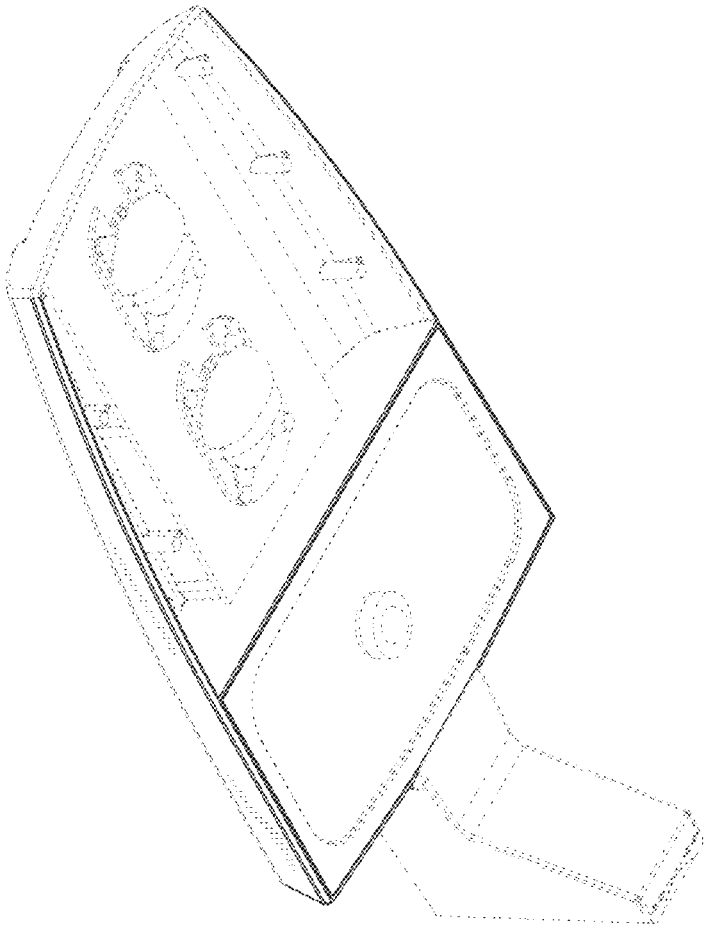

FIG. 2
AMENDED
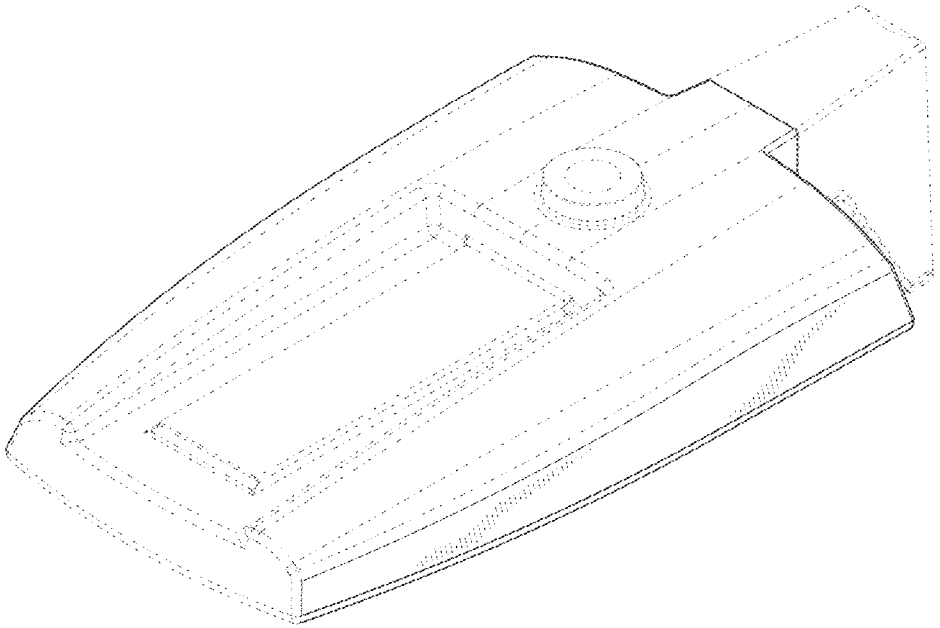

FIG. 3
AMENDED
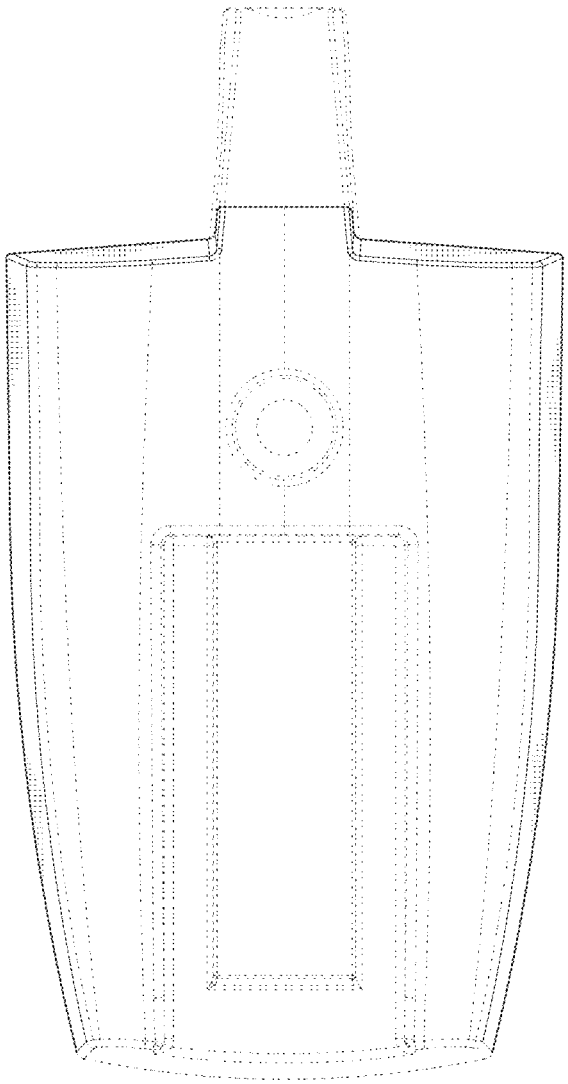

FIG. 4
AMENDED
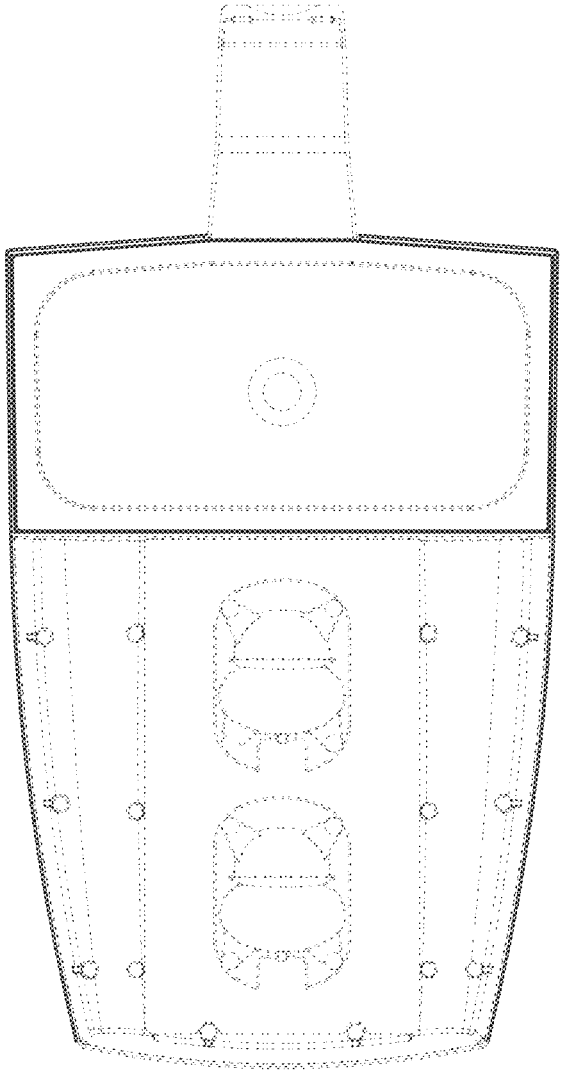

FIG. 5
AMENDED
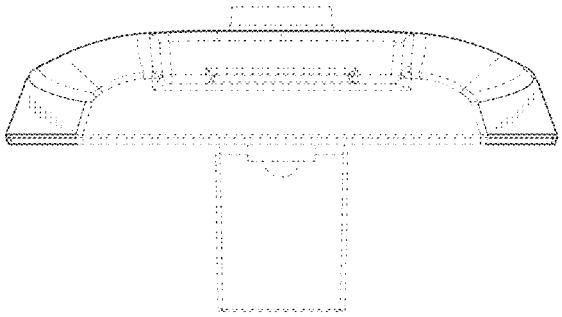

FIG. 7
AMENDED
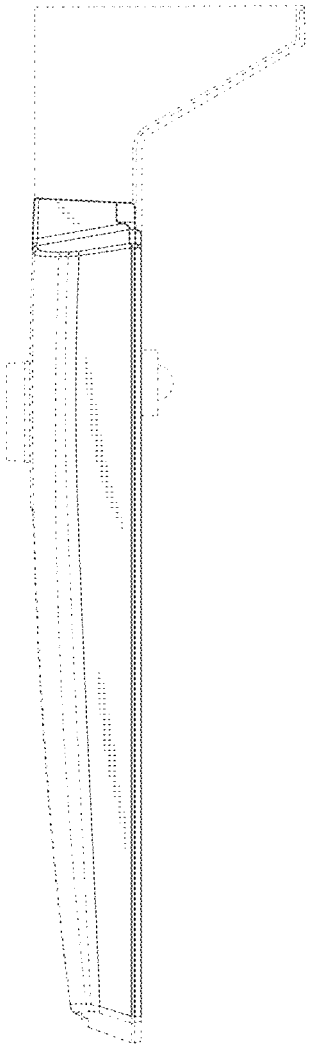
FIG. 8
AMENDED
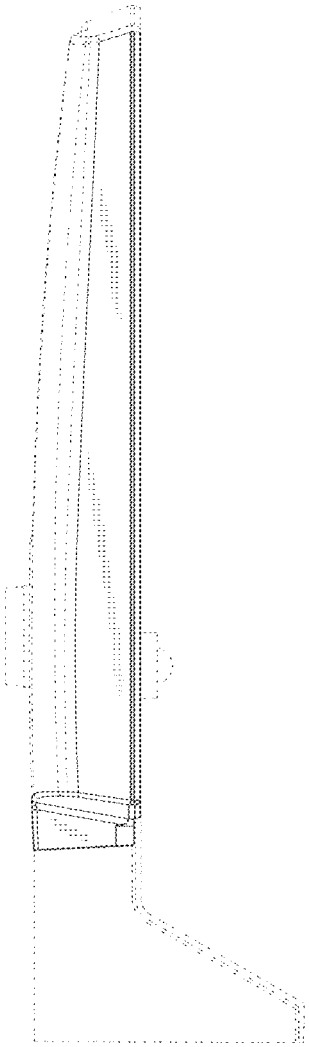

FIG. 9
AMENDED
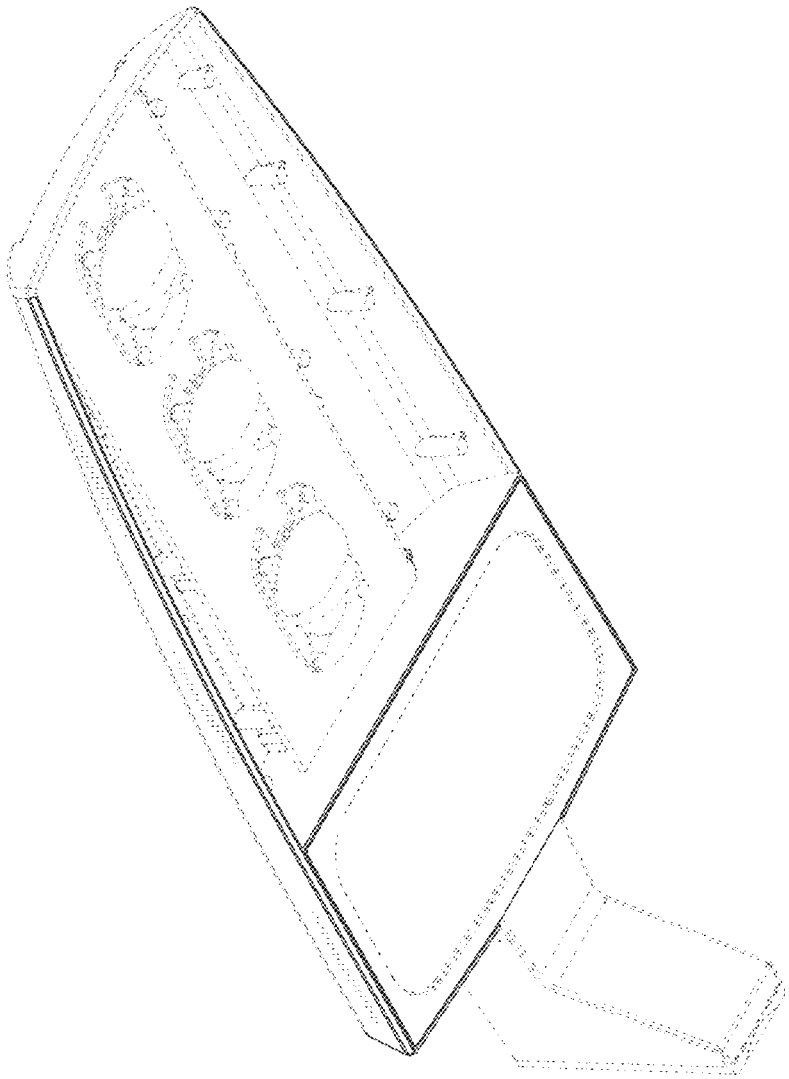

FIG. 10
AMENDED
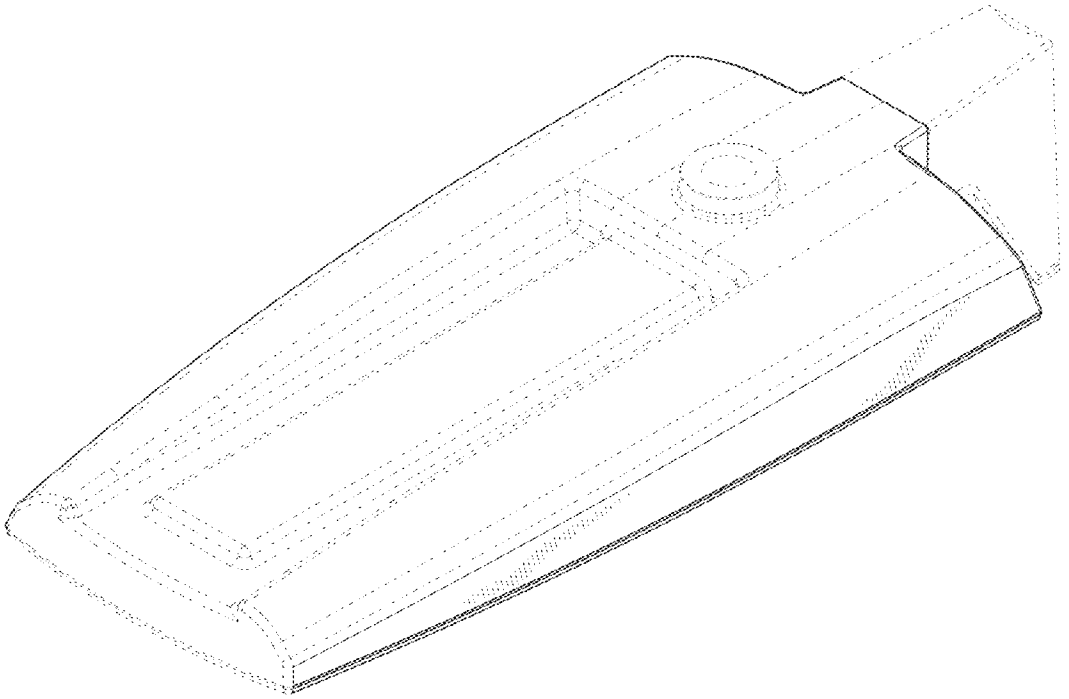

FIG. 11
AMENDED
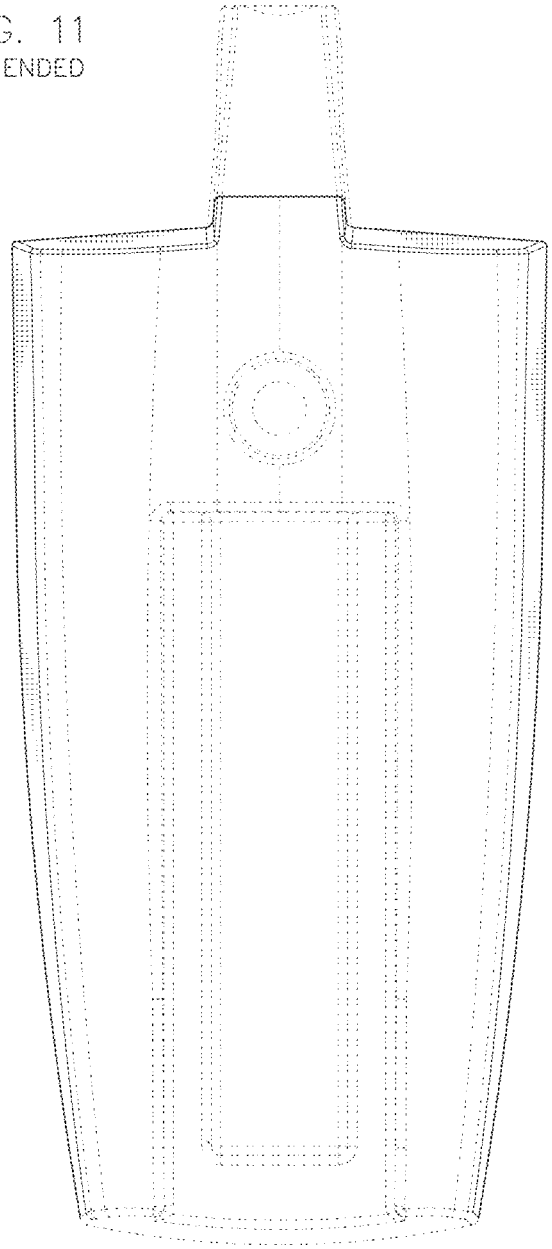

FIG. 12
AMENDED
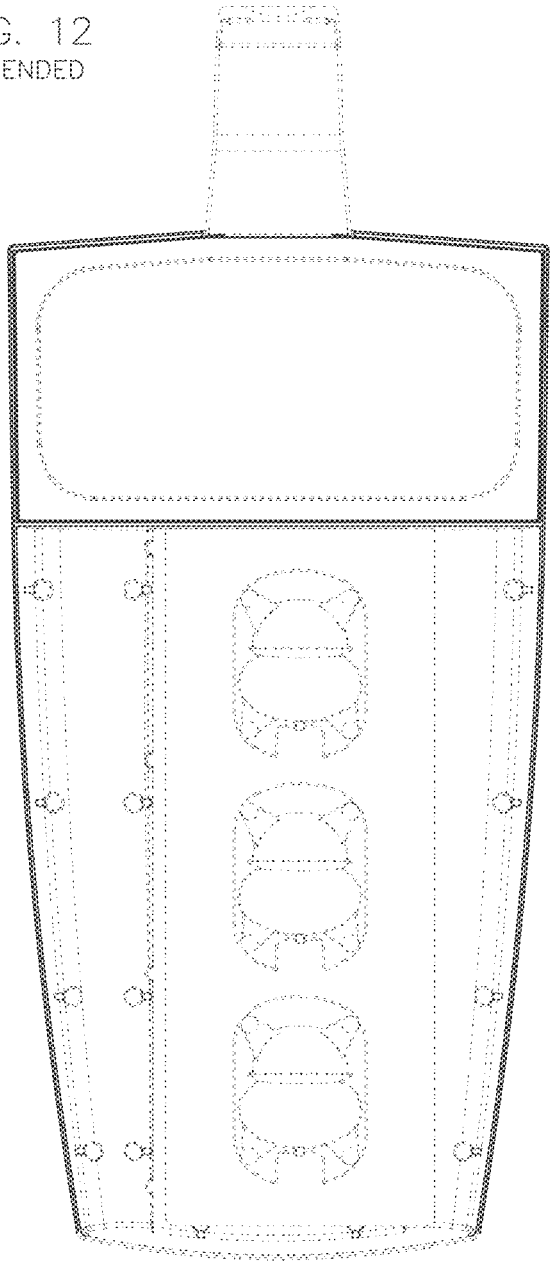

FIG. 13
AMENDED
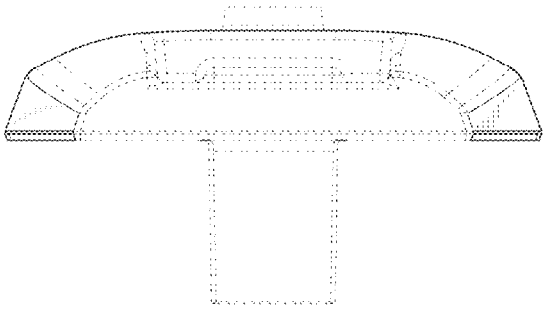

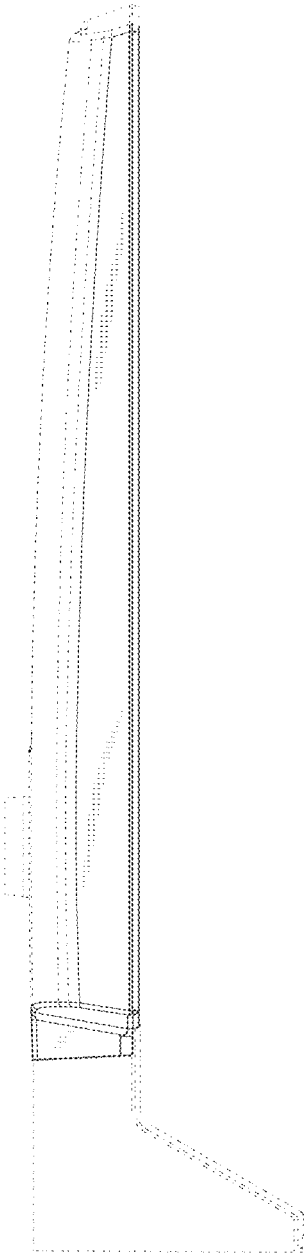

FIG. 15
AMENDED
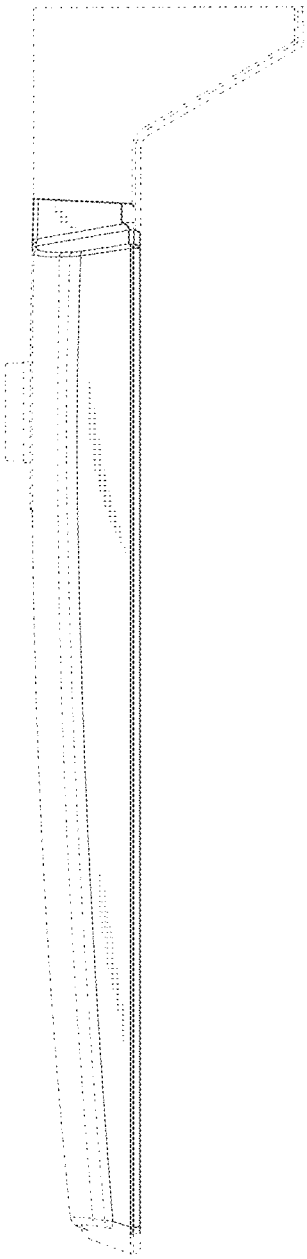
FIG. 16
AMENDED